(12) United States Patent
Haley

(10) Patent No.: US 9,583,862 B1
(45) Date of Patent: Feb. 28, 2017

(54) CONNECTOR ASSEMBLY AND RETENTION MECHANISM CONFIGURED TO MAINTAIN A MATED RELATIONSHIP

(71) Applicant: TYCO ELECTRONICS CORPORATION, Berwyn, PA (US)

(72) Inventor: Edmund J. Haley, Dillsburg, PA (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 14/934,301

(22) Filed: Nov. 6, 2015

(51) Int. Cl.
*H01R 13/447* (2006.01)

(52) U.S. Cl.
CPC .................... *H01R 13/447* (2013.01)

(58) Field of Classification Search
CPC .......................... H01R 13/6275; H01R 13/447
USPC .................. 439/368, 369, 350–358, 372
See application file for complete search history.

(56) References Cited

U.S. PATENT DOCUMENTS

| 6,848,932 | B2 * | 2/2005 | Bowling | H01R 13/518 439/358 |
| 6,890,205 | B1 * | 5/2005 | Wu | H01R 13/6275 439/108 |
| 7,189,013 | B2 | 3/2007 | Yang et al. | |
| 7,296,935 | B1 | 11/2007 | Childers et al. | |
| 8,297,856 | B2 | 10/2012 | Banal, Jr. et al. | |
| 2008/0193086 | A1 | 8/2008 | Howard et al. | |
| 2010/0135618 | A1 | 6/2010 | Howard et al. | |

* cited by examiner

*Primary Examiner* — Ross Gushi

(57) ABSTRACT

Connector assembly includes a communication connector configured to be at least one of electrically or optically coupled to a plug. The communication connector has a connector housing that includes a back side and a mating face that are on opposite ends of the connector housing. The connector assembly also includes a retention mechanism having a connector hinge and a retention clip. The connector hinge is a portion of the connector housing or is coupled to the connector housing. The retention clip has a panel, a hinge arm, and a plug arm. The panel extends between and couples to the hinge and plug arms. The hinge arm grips the connector hinge such that the retention clip is rotatable about the connector hinge between open and locked positions. The plug arm is shaped to press the plug toward the mating face when the retention clip is in the locked position.

20 Claims, 7 Drawing Sheets

CONNECTOR ASSEMBLY AND RETENTION MECHANISM CONFIGURED TO MAINTAIN A MATED RELATIONSHIP

BACKGROUND

The subject matter relates generally to retention mechanisms for communication connectors that communicate data and/or power between two different components or systems.

It is often desirable to use a retention device during the storage, shipping, or assembly of communication connectors (e.g., optical connectors or electrical connectors). For example, an optical engine may be installed into a communication system for interconnecting different components of the system or for providing a communication port of the system. The optical engine is configured to convert electrical signals to optical signals (and/or vice versa) and includes a mating interface for receiving an electrical or optical plug. During the shipping of the optical engine a dust plug is coupled to the mating interface of the optical module to prevent unwanted debris from collecting along the terminals of the mating interface. The terminals may be electrical contacts, electrical wire ends, optical fiber ends, and/or lenses. The dust plug may be held against the mating interface by a small removable retention device. When the optical module is installed into a system, the retention device and the dust plug are removed and an optical plug is mated with the optical module.

Although the retention device and the dust plug may work sufficiently in preventing debris from gathering at the mating interface of the optical module, the retention device is susceptible to being lost during shipping or mishandled during installation. In some cases, the retention device may fall into the system. These systems often have several components that are interconnected to one another through a dense assembly or network of cables and circuit boards. The retention device can damage the system or its components or otherwise interact with the system in an unwanted manner.

Accordingly, there is a need for a retention device that is easier to handle during storage, shipping, and/or installation of an electrical or optical connector.

BRIEF DESCRIPTION

In an embodiment, a connector assembly is provided that includes a communication connector configured to be at least one of electrically or optically coupled to a plug. The communication connector has a connector housing that includes a back side and a mating face that are on opposite ends of the connector housing. The mating face is configured to engage the plug. The connector assembly also includes a retention mechanism having a connector hinge and a retention clip. The connector hinge is a portion of the connector housing or is coupled to the connector housing. The retention clip has a panel, a hinge arm, and a plug arm. The panel extends between and couples to the hinge and plug arms. The hinge arm grips the connector hinge such that the retention clip is rotatable about the connector hinge between open and locked positions. The plug arm is shaped to press the plug toward the mating face when the retention clip is in the locked position. The plug may be, for example, a dust plug or an optical and/or electrical plug.

In one aspect, the panel of the retention clip may abut or be positioned immediately adjacent to the connector housing when the retention clip is in the locked position. Optionally, the retention clip may be stamped and formed from sheet metal.

In another aspect, the plug arm may be configured to flex from a base position to a biased position. The plug arm may be in the biased position when the plug is mated to the mating face and the retention clip is in the locked position. The plug arm may provide a retention force that is directed toward the mating face. Optionally, the plug arm and the hinge arm have essentially identical shapes.

In another aspect, the connector assembly may include an additional component, such as a heat sink, that is stacked onto the communication connector and the panel of the retention clip. The panel of the retention clip may be positioned between the additional component and the communication connector.

In another aspect, the connector assembly may include a discrete housing frame. The housing frame may be coupled to the connector housing. The housing frame may include the connector hinge.

In an embodiment, a retention mechanism is provided that includes a housing frame having a connector hinge and a retention clip having a panel, a hinge arm, and a plug arm. The panel extends between and couples to the hinge and plug arms. The hinge arm and the plug arm project away from the panel and are positioned along a common side of the retention clip. The hinge arm and the plug arm oppose each other with a holding space therebetween. The hinge arm is configured to grip the connector hinge such that the retention clip is rotatable about the connector hinge between open and locked positions.

In one aspect, the housing frame may include first and second legs that are spaced apart by a separation distance. The connector hinge extends between the first and second legs. Optionally, the housing frame includes a crossbar that extends between and connects the first and second legs.

DETAILED DESCRIPTION

Embodiments set forth herein include retention mechanisms and connector assemblies that include such retention mechanisms. The retention mechanisms are configured to maintain a mated relationship between a communication connector of the connector assembly and a plug. The plug may be a dust plug that prevents unwanted debris from collecting along a mating interface of the communication connector. The dust plug may be, for example, in a mated relationship with the communication connector when the connector assembly is stored or shipped. The plug may also be an optical and/or electrical plug configured to communicate data and/or electrical power. For example, the retention mechanism may maintain the mated relationship between the communication connector and the optical and/or electrical plug when the connector assembly is installed into a communication system.

The communication systems may be, for example, routers, servers, uninterruptible power supplies (UPSs), super-computers, or other computing systems. In particular embodiments, the connector assemblies are mounted to the circuit boards of a daughter card assembly in a backplane communication system. One or more of the daughter card assemblies may include a circuit board having an integrated circuit and a land grid array (LGA) socket mounted to the circuit board. The integrated circuit is configured to receive data signals from and/or transmit data signals to electrical contacts of the LGA socket. The LGA socket typically includes a socket housing that holds a two-dimensional array of the electrical contacts (hereinafter the "socket array"). The socket housing forms a seating space that is accessed from above the socket housing. Connector assemblies described herein may be mounted to the LGA sockets by positioning the connector assemblies within the seating spaces.

In particular embodiments, the connector assemblies described herein may include an optical engine that is configured to (1) convert data signals from an electrical signal form to an optical signal form and/or (2) convert data signals from an optical signal form to an electrical signal form. The optical engine may be communicatively coupled to a cable (e.g., electrical and/or optical cable) and mounted to another electrical component, such as a socket or a circuit board.

Figure 1:
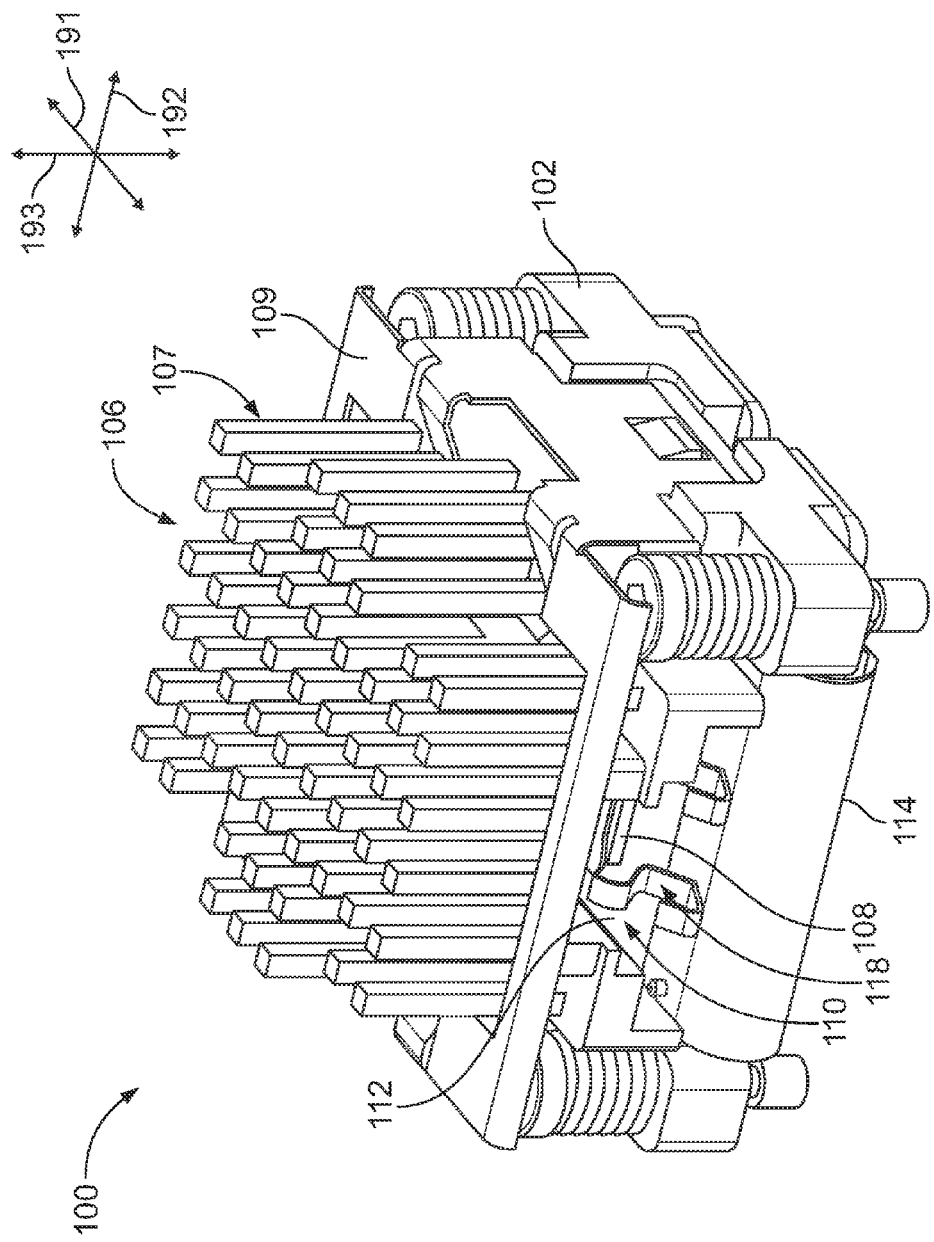
FIG. 1 is a perspective view of a connector assembly formed in accordance with an embodiment.
Figure 2:
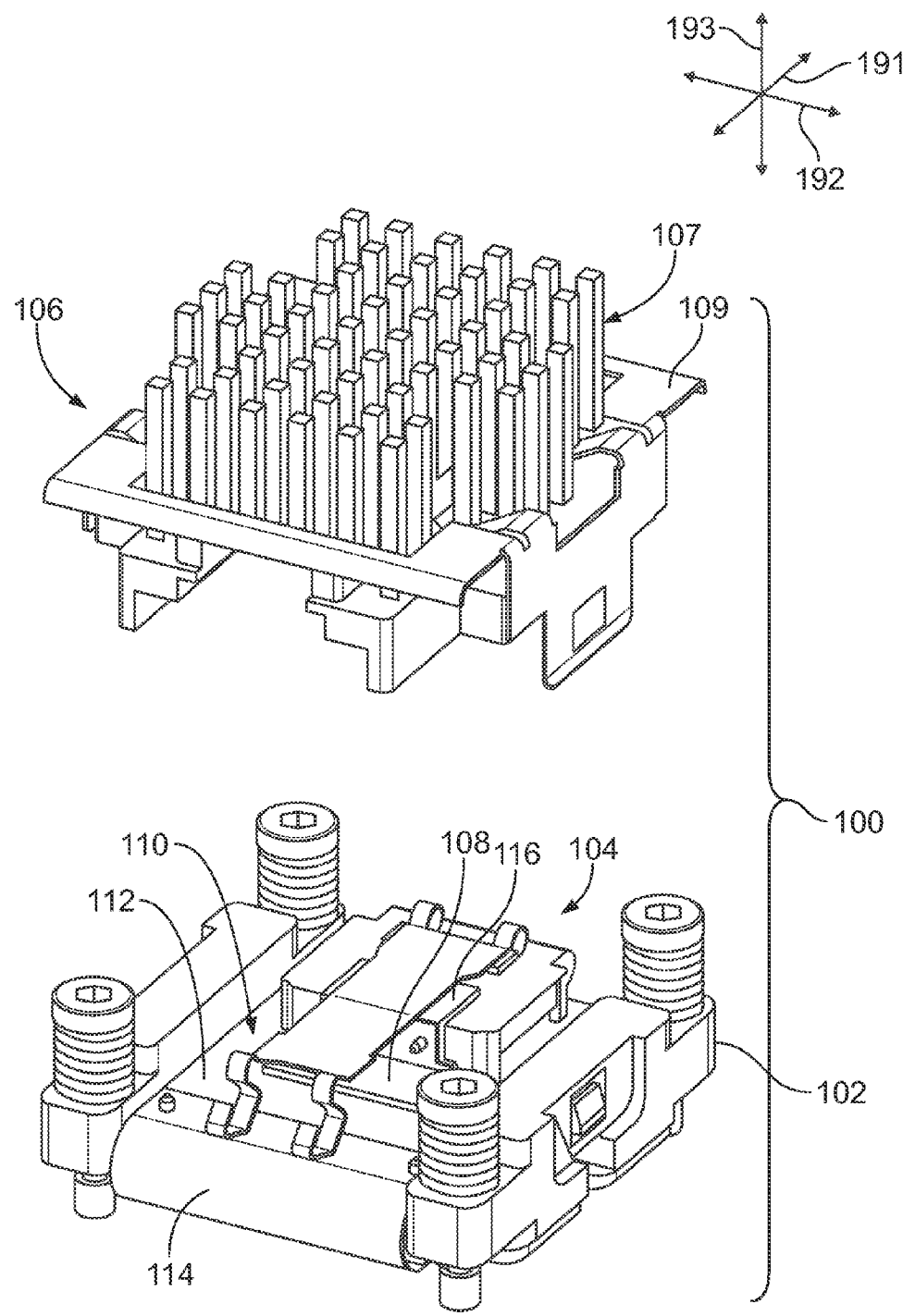
FIG. 2 is a partially exploded view of the connector assembly of FIG. 1.

FIG. 1 is a perspective view of a connector assembly 100 formed in accordance with an embodiment, and FIG. 2 is a partially exploded view of the connector assembly 100. As shown, the connector assembly 100 has a modular configuration and, as such, may be referred to as a module assembly or communication module. However, the connector assembly 100 is not limited to modular configurations. In some embodiments, the connector assembly 100 includes an optical engine that is configured to receive electrical signals and convert the electrical signals to optical signals or vice versa. The connector assembly 100 may be mounted to circuit boards of daughter card assemblies or disposed in pluggable transceivers.

However, in other embodiments, the connector assembly 100 does not include an optical engine or signal converter. The connector assembly 100 may be an electrical connector that is, for example, mounted to a circuit board and configured to mate with an electrical plug. Alternatively, the connector assembly 100 may be an optical connector that is configured to mate with an optical cable and re-direct optical signals transmitted by the optical cable.

For reference, the connector assembly 100 is oriented with respect to mutually perpendicular axes 191-193, including a mating axis 191, a lateral axis 192, and an elevation axis 193. Although the connector assembly 100 may appear to have a certain orientation with respect to gravity in FIGS. 1 and 2, it should be understood that the connector assembly 100 is not limited to any particular orientation.

The connector assembly 100 includes a carrier 102, a communication connector 104 (FIG. 2), and a heat-transfer assembly 106. In some embodiments, the heat-transfer assembly 106 includes a heat sink 107 and a mounting clip 109 that is configured to hold the heat sink 107 to the carrier 102. However, the heat sink 107 may be held against heat-generating components in other manners. The carrier 102 is configured to be mounted onto a circuit board (not shown) and/or onto another connector, such as a socket connector. The communication connector 104 is positioned between the carrier 102 and the heat-transfer assembly 106. The communication connector 104 includes processing circuitry 108 and an interposer 110. The interposer 110 may include a circuit board 112 and, optionally, a flex circuit 114 that couples to the circuit board 112. The flex circuit 114 extends over an edge of the circuit board 112 and wraps about a portion of the carrier 102 to extend between a top and a bottom of the connector assembly 100. The processing circuitry 108 is secured to a top side of the circuit board 112.

The processing circuitry 108 may include, for example, one or more integrated circuits, lasers, drivers, amplifiers (such as transimpedance amplifiers (TIAs), and the like. In the illustrated embodiment, the processing circuitry 108 is configured to receive optical signals and/or provide optical signals as described herein. For example, the communication connector 104 may constitute an optical engine. In other embodiments, however, the processing circuitry 108 may process the signals in other manners or the communication connector 104 may not include the processing circuitry 108.

The communication connector 104 includes an optical director 116 (FIG. 2) that is configured to be mounted to the processing circuitry 108. The heat sink 107 is configured to be secured to the carrier 102 with the communication connector 104 therebetween. As shown in FIG. 1, a plug cavity 118 is formed between the carrier 102 and the heat-transfer assembly 106. The optical director 116 is positioned within the plug cavity 118 such that a plug may align and interface with the optical director 116 when the plug is disposed within the plug cavity 118. The plug may be, for example, similar or identical to the plug 200 (shown in FIG. 8) or the plug 301 (shown in FIG. 10). In an exemplary embodiment, the plug is engaged to the optical director 116 prior to the heat-transfer assembly 106 being positioned over the communication connector 104 and the carrier 102.

Figure 3:
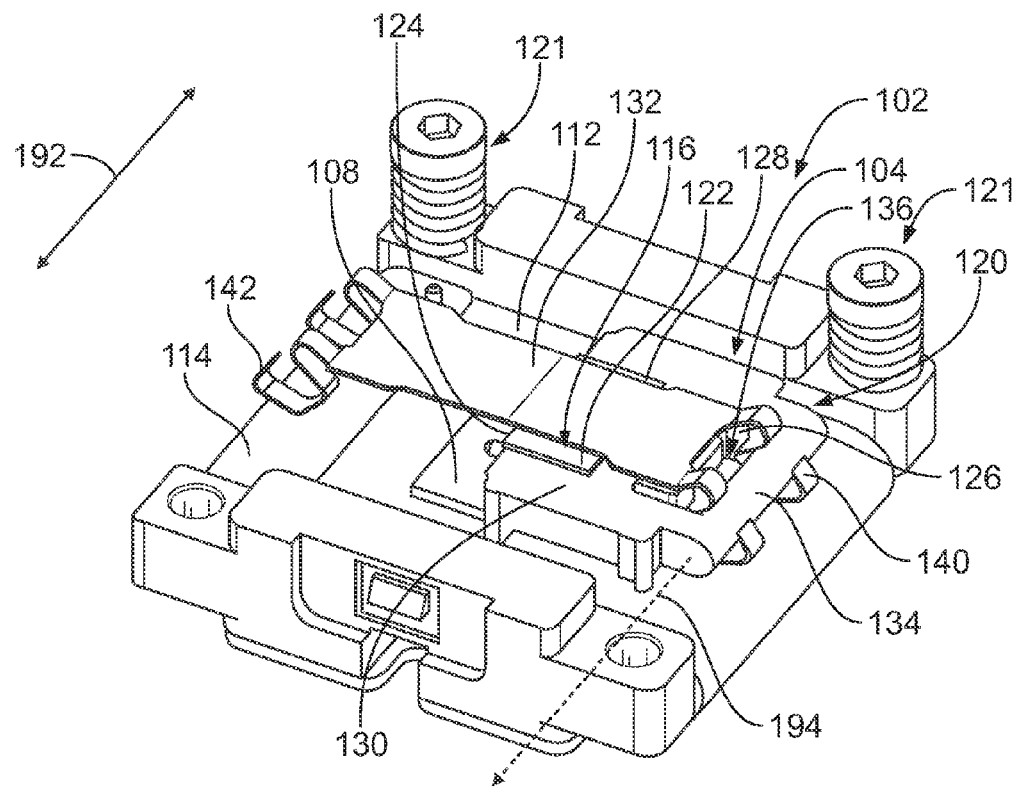
FIG. 3 is a perspective view of a portion of the connector assembly and illustrates a communication connector and a retention mechanism of the connector assembly of FIG. 1 in greater detail.

FIG. 3 is a perspective view of the communication connector 104 and a retention mechanism 120 that is operably coupled to the communication connector 104. As shown, hardware 121 (e.g., screws, springs) may be used to secure the carrier 102 to another component, such as a socket connector and/or a circuit board. For illustrative purposes, some of the hardware has been removed in FIG. 3 and other Figures. Although FIG. 3 and other figures illustrate the retention mechanism 120 being a separate component or device with respect to the communication connector 104, in other embodiments, one or more portions of the retention mechanism 120 may be part of the communication connector 104. Such an embodiment is described with respect to FIG. 10.

Figure 10:
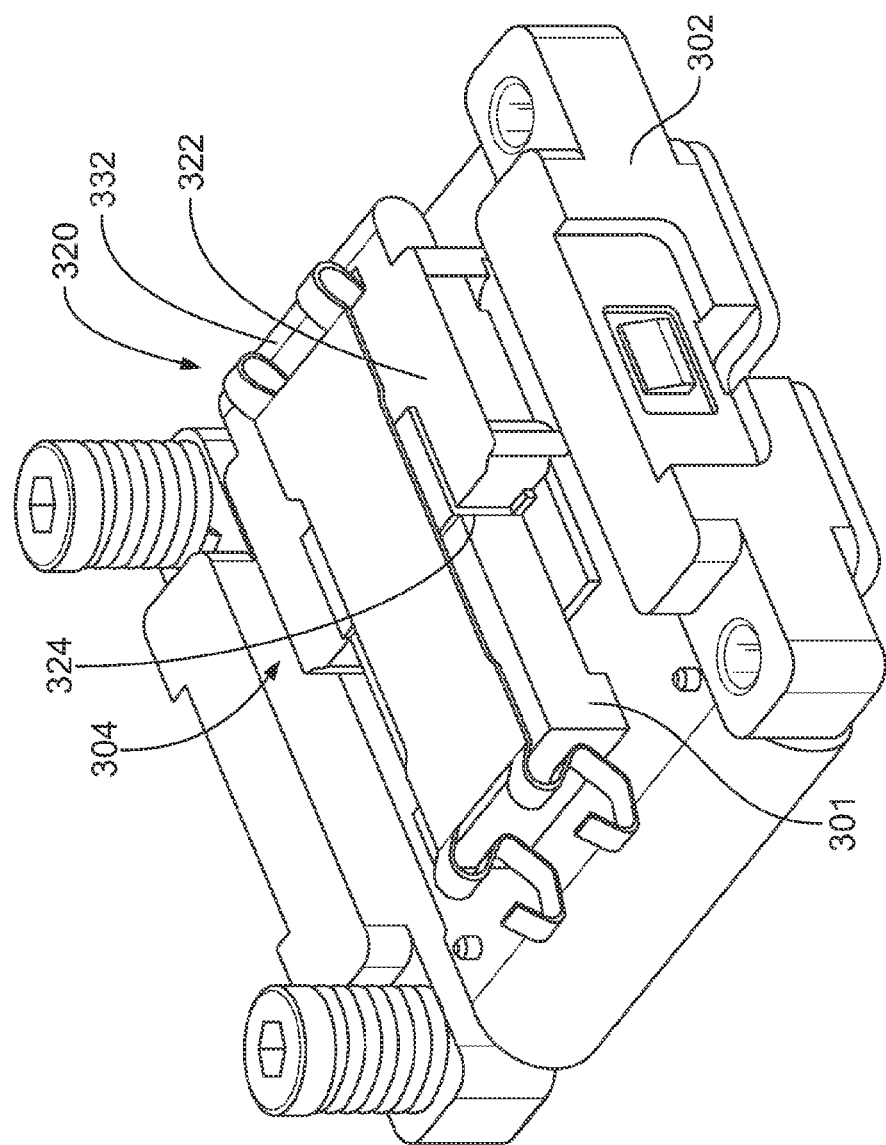
FIG. 10 is an illustration of a portion of a connector assembly in accordance with an embodiment mated with a dust plug.

The communication connector 104 may be configured to be at least one of electrically or optically coupled to a plug, such as a communication plug 200 (FIG. 8) or a dust plug 301 (FIG. 10). The optical director 116, the circuit board 112, and the processing circuitry 108 of the communication connector 104 are shown in FIG. 3. The optical director 116 is stacked onto the processing circuitry 108 and onto or over the circuit board 112. Also shown, the optical director 116 may include a connector housing 122. Although not shown, the optical director 116 includes optical elements, such as lenses, within the connector housing 122 that modifies (e.g., converts, collimates, and/or re-directs) the light signals. The connector housing 122 has a mating face 124 and a back side 126 that are located on opposite ends of the connector housing 122. The connector housing 122 also includes a top side 128 that extends between and joins the mating face 124 and the back side 126. The mating face 124 is configured to engage the plug.

The retention mechanism 120 may include a housing frame 130 and a retention clip 132. The housing frame 130 is configured to be mounted to the circuit board 112. The housing frame 130 may be, for example, secured to the circuit board 112 using hardware and/or an adhesive. Alternatively, the housing frame 130 may form an interference fit with components of the communication connector 104.

The housing frame 130 includes a connector hinge 134 that is positioned proximate to the back side 126 of the connector housing 122. In the illustrated embodiment, the connector hinge 134 is coupled to the connector housing 122. For example, the connector hinge 134 may be directly coupled to the connector housing 122 such that the connector hinge 134 engages the connector housing 122. In other embodiments, however, the connector hinge 134 may be indirectly coupled to the connector housing 122 through the circuit board 112 (or other common component that both the connector hinge 134 and the connector housing 122 engage). Yet in other embodiments, the connector hinge 134 may be a portion of the connector housing 122. An example of such an embodiment is shown in FIG. 10 with respect to a connector housing 322.

The connector hinge 134 extends lengthwise parallel to the lateral axis 192. As shown, an axis of rotation 194 extends through a center of the connector hinge 134. In FIG. 3, an arm slot 136 exists between the connector hinge 134 and the connector housing 122. For embodiments in which the connector hinge 134 is a portion of the connector housing 122, the connector housing 122 may be shaped to include the arm slot 136.

Figure 4:
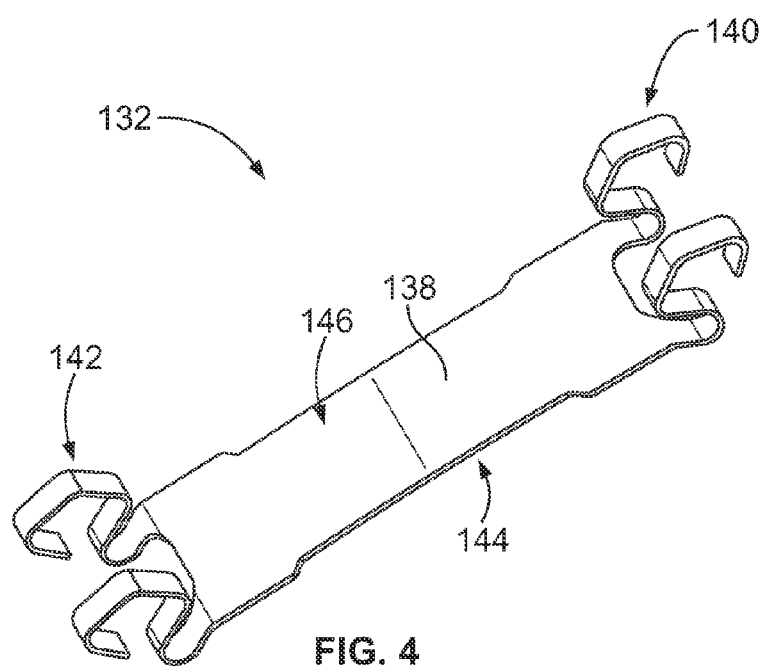
FIG. 4 is an isolated perspective view of a retention clip of the retention mechanism in accordance with an embodiment.
Figure 5:
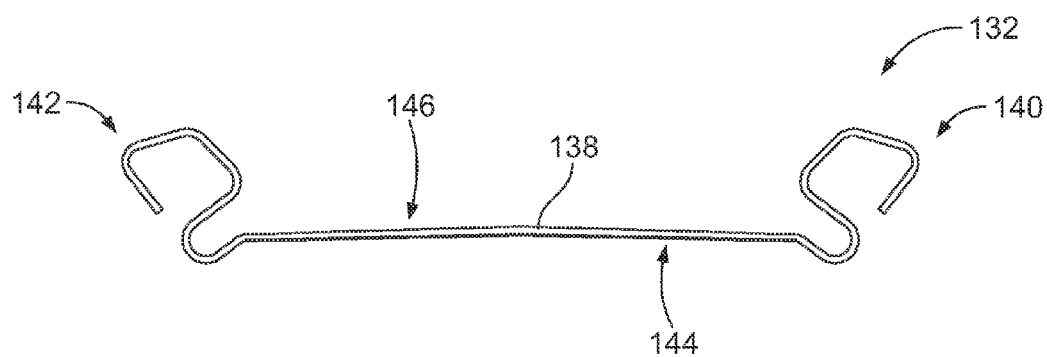
FIG. 5 is an isolated side view of the retention clip of FIG. 4.

FIGS. 4 and 5 show isolated perspective and side views, respectively, of the retention clip. The retention clip 132 includes a panel 138, hinge arms 140, and plug arms 142. The panel 138 extends between and couples to the hinge arms 140 and the plug arms 142. In the illustrated embodiment, the retention clip 132 includes a pair of the hinge arms 140 and a pair of the plug arms 142. In other embodiments, the retention clip 132 may include only a single hinge arm 140 and/or only a single plug arm 142. Alternatively, the retention clip 132 may include more than two hinge arms 140 and/or more than two plug arms 142. The retention clip 132 may be stamped and formed of sheet metal, in a specific embodiment. In other embodiments, the retention clip 132 may be formed of any material having sufficient strength to provide the retention function.

The retention clip 132 has an outer side 144 and an inner side 146 that are opposite each other. The panel 138 separates the outer and inner sides 144, 146. The outer side 144 is configured to generally face an exterior of the communication connector 104 (FIG. 2) or the retention mechanism 120 (FIG. 3) when the retention clip 132 is in a locked or closed position. The inner side 146 is configured to generally face the communication connector 104 or, more specifically, the connector housing 122 (FIG. 3) when the retention clip 132 is in the locked position. The panel 138 may have a planar body. As shown, the hinge arms 140 and the plug arms 142 project away from the panel 138 and are general disposed along the inner side 146. As such, the hinge arms 140 and the plug arms 142 are positioned along a common side 146 of the retention clip 132. In other embodiments, however, the hinge arms 140 and the plug arms 142 may be positioned along opposite sides of the retention clip 132. For example, the hinge arms 140 may be generally disposed along the outer side 144, and the plug arms 142 may be generally disposed along the inner side 146. In such embodiments, the connector hinge 134 (FIG. 3) may have a different position relative to the connector housing 122 or the circuit board 112 (FIG. 2). For example, the connector hinge 134 may be elevated such that a space exists between the connector hinge 134 and the circuit board 112. The space may allow the retention clip 132 to extend between the connector hinge 134 and the circuit board 112.

In the illustrated embodiment, the hinge arms 140 and the plug arms 142 have identical shapes and the retention clip 132 has a symmetry that allows the hinge arms 140 and the plug arms 142 to switch positions. More specifically, the retention clip 132 may be re-positioned such that the plug arms 142 function as the hinge arms and the hinge arms 140 function as the plug arms. As such, the retention clip 132 permits an individual to assemble the retention mechanism 120 (FIG. 2) using either orientation of the retention clip 132. In other embodiments, however, the retention clip 132 may be particularly configured such that the retention clip 132 may have only one orientation for assembling the retention mechanism 120.

Returning to FIG. 3, the hinge arm 140 is shaped to surround the connector hinge 134. More specifically, the hinge arm 140 may surround at least a majority of the connector hinge 134. When the retention clip 132 is rotatably coupled to the connector hinge 134, the hinge arm 140 may grip the connector hinge 134 to reduce the likelihood that the retention clip 132 becomes inadvertently detached from the connector hinge 134. During operation, the hinge arms 140 grip the connector hinge 134 such that the retention clip 132 is rotatable about the connector hinge 134 (or rotatable about the axis of rotation 194) between open and locked positions. In FIG. 3, the retention clip 132 is in the locked position. As described below, the plug arms 142 are shaped to press the plug toward the mating face 124 when the retention clip 132 is in the locked position.

Figure 6:
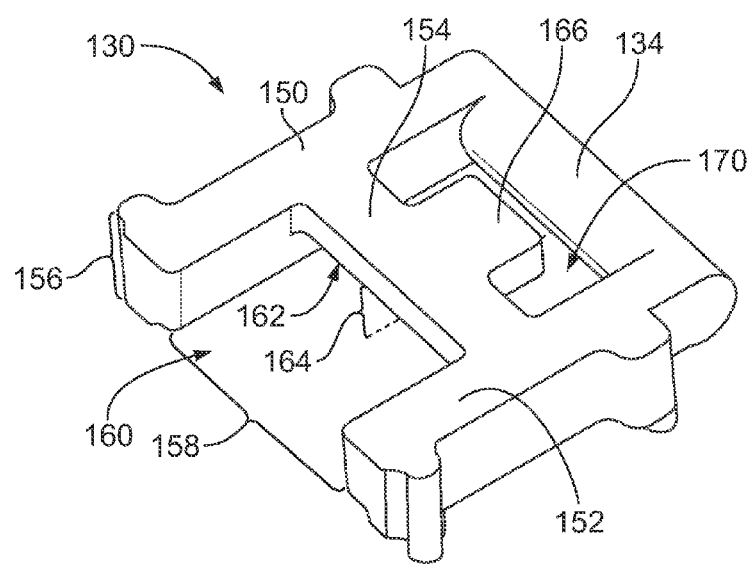
FIG. 6 is an isolated perspective view of a housing frame that may be a component of the connector assembly of FIG. 1.

FIG. 6 is an isolated perspective view of the housing frame 130. The housing frame 130 includes the connector hinge 134, first and second legs 150, 152, and a crossbar 154. In the illustrated embodiment, each of the connector hinge 134 and the crossbar 154 extend between and join the first and second legs 150, 152. In other embodiments, however, one or both of the connector hinge 134 and the crossbar 154 may not join the first and second legs 150, 152. For example, the crossbar 154 and/or the connector hinge 134 may extend from one of the legs and toward the other leg without engaging or coupling to the other leg. In such embodiments, the housing frame 130 may include a plurality of discrete elements that are positioned relative to one another. In the illustrated embodiment, the housing frame 130 is a single continuous body that is molded or otherwise shaped to include the features described herein.

The first and second legs 150, 152 are spaced apart by a separation distance 158 and thereby define a connector space 160 therebetween. Also shown, each of the first and second legs 150, 152 has a height 156. The height 156 may be measured from a bottom plane to a top plane. The bottom plane may coincide with bottom surfaces of the first and second legs 150, 152 or coincides with a top surface of the circuit board 112 (FIG. 2). The top plane may coincide with top surfaces of the first and second legs 150, 152. The crossbar 154 has an inner surface 162 that is configured to face the circuit board 112 and/or the connector housing 122 (FIG. 3). The inner surface 162 and the circuit board 112 (or the bottom plane) define a gap 164 therebetween. The connector space 160 includes the gap 164 and exists below the crossbar 154.

Also shown, the crossbar 154 includes a tab 166. The crossbar 154 and the connector hinge 134 define a frame slot 170. When the housing frame 130 is mounted over the connector housing 122 (FIG. 3), the frame slot 170 receives a portion of the connector housing 122 thereby defining the arm slot 136 (FIG. 3).

Figure 7:
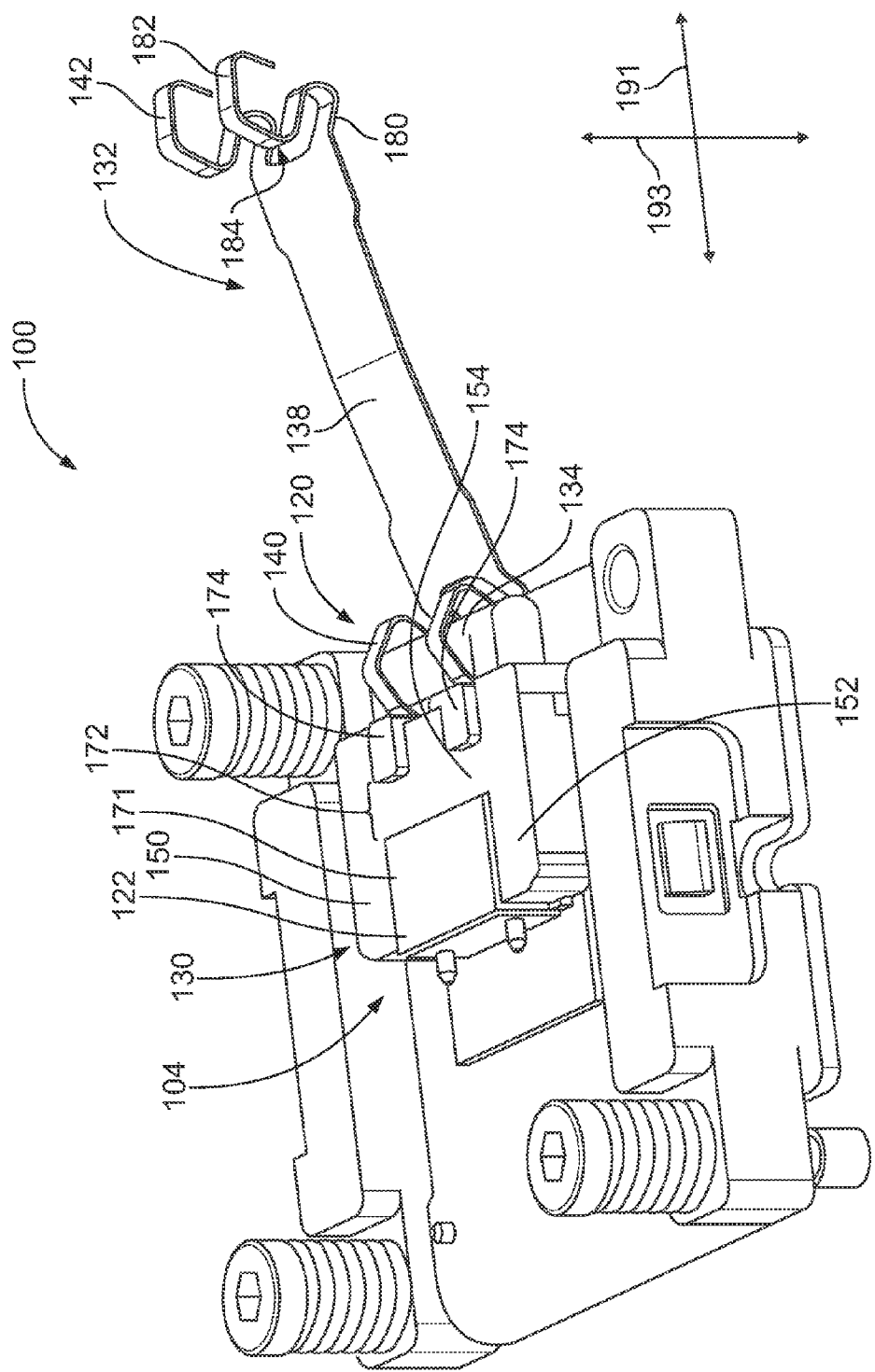
FIG. 7 is an illustration of a portion of the connector assembly in which the retention mechanism in an open position or state.

FIG. 7 is an illustration of a portion of the connector assembly 100 in which the retention mechanism 120 is in an open position or state. The connector housing 122 of the communication connector 104 includes a mating portion 171, a pair of reference portions (or elements) 174, and a channel 172 that is positioned between the mating portion 171 and the reference portions 174. The channel 172 is sized and shaped to receive the crossbar 154 of the housing frame 130. The tab 166 is positioned between the reference portions 174. The arm slot 136 exists between the connector hinge 134 and the tab 166 and the reference portions 174. As shown, forward portions of the first and second legs 150, 152 extend from the crossbar 154 to respective distal ends. The forward portions are sized, shaped, and positioned with respect to each other to receive the mating portion 171 of the optical director 116.

In an exemplary embodiment, the mating portion 171 may include optical paths (not shown) having, for example, lenses that re-direct optical signals. The optical signals may be propagating in a direction that is substantially parallel to the mating axis 191 and directed such that the optical signals propagate in a direction that is substantially parallel to the elevation axis 193. Alternatively, the optical paths may re-direct optical signals going in a reverse direction.

Figure 8:
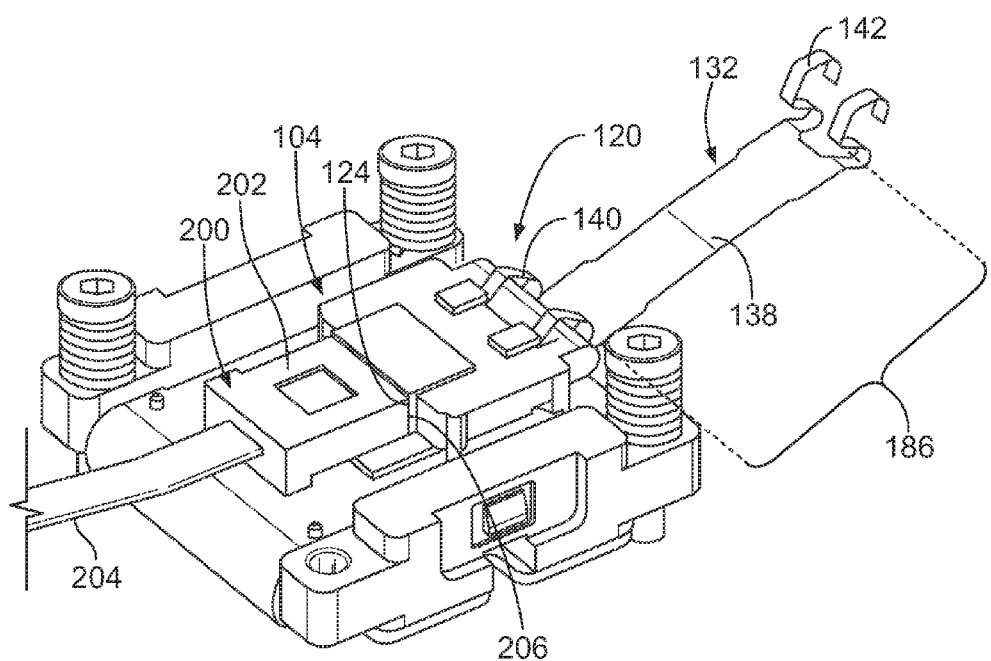
FIG. 8 is an illustration of the portion of the connector assembly in FIG. 7 when the communication connector is in a mated relationship with a plug.

Also shown in FIG. 7, the hinge arms 140 surround and grip the connector hinge 134 such that the retention clip 132 is rotatably coupled thereto. The hinge arms 140 and the plug arms 142 may be similarly or identically shaped. For example, the plug arms 142 include a flex segment 180 and a grip segment 182. The flex segment 180 is directly coupled to the panel 138 and extends between the panel 138 and the grip segment 182. In the illustrated embodiment, the flex segment 180 folds back onto itself. The flex segment 180 is shaped to form a plug-engaging surface 184 that is configured to directly engage the plug 200 (FIG. 8). The flex segment 180 is also shaped to permit the grip segment 182 to be deflected from a base or undeflected position (shown in FIG. 7) to a biased or deflected position (shown in FIG. 9). The grip segment 182 may be an elongated strip that is shaped to grip the connector hinge 134. For example, the grip segment 182 may be C-shaped or U-shaped. In the illustrated embodiment, the plug arms 142 are substantially S-shaped, but other shapes may be used in other embodiments.

Figure 9:
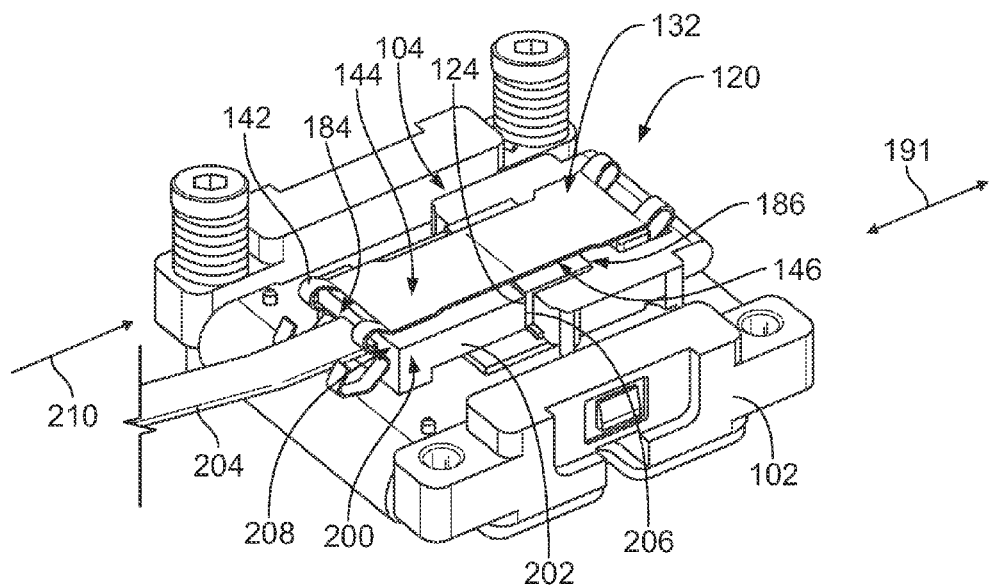
FIG. 9 is an illustration of the portion of the connector assembly in FIG. 7 in which the retention mechanism is in a closed position or state to maintain the mated relationship.

FIGS. 8 and 9 are illustrations of the retention mechanism 120 with respect to the communication connector 104 when the retention clip 132 is in open and closed positions, respectively, with respect to the plug 200. The plug 200 is in a mated relationship with the communication connector 104. As shown in FIG. 8, the hinge arms 140 and the plug arms 142 are positioned along a common side of the panel 138 and oppose each other with a holding space 186 therebetween. The holding space 186 is sized and shaped to have the connector housing 122 and the plug 200 disposed therein.

In the illustrated embodiment, the plug 200 is an optical plug having a plug housing 202 and a cable 204 that includes a plurality of optical fibers and that is coupled to the plug housing 202. The plug housing 202 has a mating face 206 that is configured to mate with or interface with the mating face 124 of the communication connector 104. In other embodiments, however, the plug 200 is an electrical plug and the cables 204 are electrical wire or electrical cables.

In FIG. 9, the retention clip 132 is in the closed position such that the plug 200 and the connector housing 122 are positioned within the holding space 186. The plug arms 142 are engaged to a loading end 208 of the plug housing 202. The loading end 208 couples to the cable 204. As shown, the cable 204 is positioned between the two plug arms 142. The plug arms 142 are in biased positions in FIG. 9. More specifically, as the retention clip 132 is rotated to the closed position, the plug-engaging surfaces 184 engage the plug housing 202 and such that the plug arms 142 are deflected from the corresponding base positions to the corresponding biased positions. In the biased positions, the plug arms 142 provide or exert a retention force 210 that is directed along the mating axis 191. The retention force 210 is directed toward the mating face 124 thereby maintaining the mated relationship between the plug 200 and the communication connector 104. In the locked position, the panel 138 abuts or is positioned immediately adjacent to the connector housing 122.

After securing the plug 200 to the communication connector 104, an additional component may be stacked over the retention clip 132 and the plug 200. The additional component may be, for example, a heat-transfer assembly, such as the heat-transfer assembly 106 (FIG. 1). In some embodiments, at least a majority of the heat (or thermal energy) generated by the communication connector 104 and/or the plug 200 may be transferred to the heat-transfer assembly through the carrier 102. In other embodiments, the panel 138 may have a thickness and comprise a thermally-conductive material such that at least some of the heat generated by the communication connector 104 and/or the plug 200 is transferred through the panel 138 to the heat-transfer assembly 106. The panel 138 may intimately engage the communication connector 104 and the plug 200 on the inner side 146 of the retention clip 132 and the heat sink 107 (FIG. 1) on the outer side 144 of the retention clip 132.

In an exemplary embodiment, the plug arms 142 do not clear or project out of the plug cavity, such as the plug cavity 118 (FIG. 1). Accordingly, when the additional component is mounted onto the carrier 102, the connector assembly 100 may provide a modular component in which the optical and/or electrical cable remains secured to the communication connector 104 in the mated relationship. In some embodiments, the size and shape of the panel 138 may allow the connector assembly 100 to maintain its height.

FIG. 10 is an illustration of a communication connector 304 and a retention mechanism 320, according to another specific embodiment. The communication connector 304 and the retention mechanism 320 are mounted over a carrier 302. The communication connector 304, the retention mechanism 320, and the carrier 302 may be similar to the communication connector 104 (FIG. 1), the retention mechanism 120 (FIG. 2), and the carrier 102 (FIG. 1), respectively, and may be used to form a connector assembly (not shown), such as the connector assembly 100 (FIG. 1). Unlike the retention mechanism 120, however, the retention mechanism 320 includes a portion of a connector housing 322. More specifically, the retention mechanism 320 does not include a discrete housing frame and, instead, the connector housing 322 includes a connector hinge 332.

FIG. 10 is an illustration of the communication connector 304 in a mated relationship with the dust plug 301. The dust plug 301 may have a similar shape as the plug 200 (FIG. 8). Embodiments may enable shipping the communication connector 304 and the corresponding connector assembly with the dust plug so that unwanted debris does collect along the mating interface of the communication connector 304. For example, the dust plug 301 may prevent debris from gathering along a mating face (not shown) of the connector housing 322 and/or lenses or optical fiber ends (not shown) that are positioned proximate to the mating face 324. The communication connector 304 or the connector assembly may be shipped as shown in FIG. 10. Optionally, the communication connector 304 or the connector assembly may be shipped with a kit that includes, for example, a heat sink.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A connector assembly comprising:
a communication connector configured to be at least one of electrically or optically coupled to a plug, the communication connector having a connector housing that includes a mating face configured to engage the plug;
a retention mechanism including a connector hinge and a retention clip, the connector hinge being a portion of the connector housing or being coupled to the connector housing, the retention clip having a panel, a hinge arm, and a plug arm, wherein the panel extends between and couples to the hinge and plug arms, the hinge arm and the plug arm being positioned along a common side of the panel, the hinge arm gripping the connector hinge such that the retention clip is rotatable about the connector hinge between open and locked positions, the plug arm configured to be deflected by the plug as the retention clip is rotated to the locked position, the plug arm having a flex segment that is directly coupled to the panel and is dimensioned to permit the plug arm to be deflected away from the panel to a biased position, the plug arm pressing the plug toward the mating face when in the biased position.

2. The connector assembly of claim 1, wherein the panel of the retention clip abuts or is positioned immediately adjacent to the connector housing when the retention clip is in the locked position.

3. The connector assembly of claim 1, wherein the plug arm is configured to be deflected from a base position to a biased position, the plug arm being in the biased position when the plug is mated to the mating face and the retention clip is in the locked position, the plug arm providing a retention force that is directed toward the mating face when the plug arm is in the biased position.

4. The connector assembly of claim 1, wherein the plug arm and the hinge arm have essentially identical shapes.

5. The connector assembly of claim 1, further comprising a discrete housing frame, the housing frame being coupled to the connector housing, the housing frame including the connector hinge.

6. The connector assembly of claim 1, wherein the connector housing includes the connector hinge.

7. The connector assembly of claim 1, wherein the plug arm is a first plug arm and the retention clip includes a second plug arm that is also shaped to press the plug toward the mating face when the retention clip is in the locked position, wherein the first and second plug arms are coupled to the panel and positioned along the common side of the panel, the first and second plug arms being spaced apart from each other to permit a cable of the plug to extend therebetween.

8. The connector assembly of claim 1, further comprising the plug, the plug being a dust plug having a front side and a back side that face in opposite directions, the front side engaging the communication connector, wherein the plug arm has a plug-engaging surface that engages the back side of the dust plug when the retention clip is in the locked position, the plug-engaging surface opposing the mating face of the communication connector with the dust plug therebetween.

9. A retention mechanism comprising:
a housing frame including a connector hinge; and
a retention clip having a panel, a hinge arm, and a plug arm, wherein the panel extends between and couples to the hinge and plug arms, the hinge arm and the plug arm projecting away from the panel and being positioned along a common side of the retention clip, the hinge arm and the plug arm opposing each other with a holding space therebetween, wherein the hinge arm is configured to grip the connector hinge such that the retention clip is rotatable about the connector hinge between open and locked positions;

wherein the plug arm is configured to be deflected by a plug when the retention clip is moved to the locked position, the plug arm having a flex segment that is directly coupled to the panel and is dimensioned to permit the plug arm to be deflected away from the panel to a biased position in which the plug arm presses against the plug.

10. The retention mechanism of claim 9, wherein the housing frame includes first and second legs that are spaced apart by a separation distance, the connector hinge extending between the first and second legs.

11. The retention mechanism of claim 10, wherein the housing frame includes a crossbar that extends between and connects the first and second legs and wherein a connector space exists below the crossbar.

12. The retention mechanism of claim 9, wherein the plug arm includes a grip segment and a flex segment, the flex segment being directly coupled to the panel and interconnecting the grip segment and the panel, the flex segment permitting the grip segment to move with respect to the panel.

13. The retention mechanism of claim 12, wherein the grip segment is an elongated strip that is C-shaped.

14. The retention mechanism of claim 9, wherein the retention clip includes a plurality of the plug arms and a plurality of the hinge arms.

15. The retention mechanism of claim 9, wherein the panel has a planar body.

16. The retention mechanism of claim 9, wherein the plug arm is configured to flex from a base position to a biased position, the plug arm providing a retention force that is directed toward the hinge arm when in the biased position.

17. The retention mechanism of claim 9, wherein the hinge arm is shaped to surround the connector hinge.

18. A connector assembly comprising:
a communication connector configured to be at least one of electrically or optically coupled to a plug, the communication connector having a connector housing that includes a mating face configured to engage the plug;
a retention mechanism including a connector hinge and a retention clip, the connector hinge being a portion of the connector housing or being coupled to the connector housing, the retention clip having a panel, a hinge arm, and a plug arm, wherein the panel extends between and couples to the hinge and plug arms, the hinge arm gripping the connector hinge such that the retention clip is rotatable about the connector hinge between open and locked positions, the plug arm being shaped to press the plug toward the mating face when the retention clip is in the locked position; and
an additional component that is stacked onto the communication connector and the panel of the retention clip, the panel of the retention clip being positioned between the additional component and the communication connector.

19. The connector assembly of claim 18, wherein the additional component includes a heat sink.

20. A retention mechanism comprising:
a housing frame including a connector hinge; and
a retention clip having a panel, a hinge arm, and a plug arm, wherein the panel extends between and couples to the hinge and plug arms, the hinge arm and the plug arm projecting away from the panel and being positioned along a common side of the retention clip, the hinge arm and the plug arm opposing each other with a holding space therebetween, wherein the hinge arm is configured to grip the connector hinge such that the retention clip is rotatable about the connector hinge between open and locked positions, wherein the plug arm and the hinge arm have essentially identical shapes.

* * * * *